United States Patent [19]

Frank

[11] Patent Number: 4,798,481

[45] Date of Patent: Jan. 17, 1989

[54] ROLLING BEARING SLEWING RING

[75] Inventor: Hubertus Frank, Hochstadt, Fed. Rep. of Germany

[73] Assignee: INA Walzlager Schaeffler KG, Fed. Rep. of Germany

[21] Appl. No.: 3,939

[22] Filed: Jan. 16, 1987

[30] Foreign Application Priority Data

Jan. 24, 1986 [DE] Fed. Rep. of Germany ....... 3602051

[51] Int. Cl.⁴ .......................... F16C 33/76; F16J 15/00
[52] U.S. Cl. ........................................ 384/477; 277/9;
277/152; 277/167.5; 277/187; 384/482;
384/607
[58] Field of Search ........ 384/477, 481, 482, 484–486,
384/607, 130, 140, 147, 148, 151, 609, 622;
277/9, 95, 96, 152, 187, 184, 167.5, 101

[56] References Cited

U.S. PATENT DOCUMENTS

| | | | |
|---|---|---|---|
| 2,277,810 | 3/1942 | Zotter | 384/477 X |
| 2,600,434 | 6/1952 | Saywell | 384/482 X |
| 3,010,771 | 11/1961 | Cogger | 384/482 |
| 3,097,896 | 7/1963 | Wasley | 384/482 |
| 4,639,149 | 1/1987 | Bras et al. | 384/484 X |

Primary Examiner—Stuart S. Levy
Assistant Examiner—Thomas R. Hannon
Attorney, Agent, or Firm—Bierman & Muserlian

[57] ABSTRACT

A rolling bearing slewing ring comprising two mutually concentric bearing rings between which rolling elements roll, one bearing ring having a seal in sliding engagement with a cylindrical seal contact surface on the other bearing ring, characterized in that the seal contact surface (5) is a finite band (6) of a wear resistant material secured to a retention surface (7,16,22,30,40) of the bearing ring.

10 Claims, 6 Drawing Sheets

ROLLING BEARING SLEWING RING

STATE OF THE ART

Roller bearing slewing rings having a seal contact surface directly on the cylindrical surface of the other bearing ring are known but they have the disadvantage that the seal contact surface wears in the course of time and the entire slewing ring has to be taken completely apart to repair the contact surface of the supporting ring. This means considerable expense which may be increased if it is necessary to heat treat the seal contact surface.

It has been suggested to place the seal contact surface on separate rings of comparatively small sections joined to the bearing ring which has the advantage that rings can be removed from the bearing ring and be repaired or replaced in the event of wear of the seal contact surface. While repair of the rolling bearing slewing ring is considerably simplified with this construction, substantial problems occur in the ring manufacture or when repairing the worn rings by chip removal machining and especially in their heat treatment because of their small cross section so this solution is not satisfactory.

OBJECTS OF THE INVENTION

It is an object of the invention to provide a novel rolling bearing slewing ring which can be simply and economically repaired for wear of the seal contact surface.

This and other objects and advantages of the invention will become obvious from the following detailed description.

THE INVENTION

The novel rolling bearing slewing ring of the invention is comprised of two mutually concentric bearing rings between which rolling elements roll, one bearing ring having a seal in sliding engagement with a cylindrical seal contact surface on the other bearing ring, characterized in that the seal contact surface (5) is a finite band (6) of a wear resistant material secured to a retention surface (7,16,22, 30,40) of the bearing ring. The finite band may be made of a cold hardened steel of sufficient hardness or of a ceramic material, for instance.

To repair a worn seal contact surface in the slewing ring of the invention, one merely removes the worn band, cuts a new band to the required length and attaches it to the bearing ring which is a simple and economical operation. This avoids the prior art disadvantages of chip removal machining, heat treating operation and/or disassembly of the slewing ring.

In a variation of the invention, the union of the mutually facing ends of the finite band is at an angle to the axis of the rolling bearing slewing ring which avoids damage to the seal. According to a further modification, a polymeric material is placed between the mutually facing ends of the band which is particularly useful when the slewing ring is to be lubricated by a relatively thin lubricant because the lubricant could ooze through any slit that could be present at the union of the ends. This measure is omitted when grease is the lubricant employed.

In a variation of the invention, the finite band may be fastened to the bearing ring whereby the retention surface is axially limited on both sides by a radially oriented projection with the band edges being accommodated between the projections. The band may be retained between the projections by being both frictionally and form closing engaged.

In a further variation of the invention, the finite band may also be materially fastened to the retention surface, especially by glueing whereby the retention surface does not have to be limited by projections which lowers the reduction costs. The finite band may also be fastened to the retention surface which is provided with a recess extending over its entire circumference with the band being axially clamped between the projections.

In another variation of the invention, the retention surface may be disposed as a separate retaining ring fastened to the bearing ring. Since such a retaining ring does not require chip removal machining or heat treatment if the seal contact surface has to be replaced, the prior art disadvantages of separate rings are mostly eliminated. One face of the retaining ring may be held against a bearing surface of the bearing ring and the end facing away from the said face may be provided with a projection limiting the retention surface at its other end which is formed by a contact surface area rising above the contact surface. In a final embodiment of the invention, the retaining ring is provided, at its face resting against the bearing surface of the bearing ring, with a shoulder emanating from the retention surface and the retaining ring is axially braced against the bearing ring in the area of this shoulder so that the band edges are axially clamped between the projections.

Referring now to the drawings.

Figure 1:
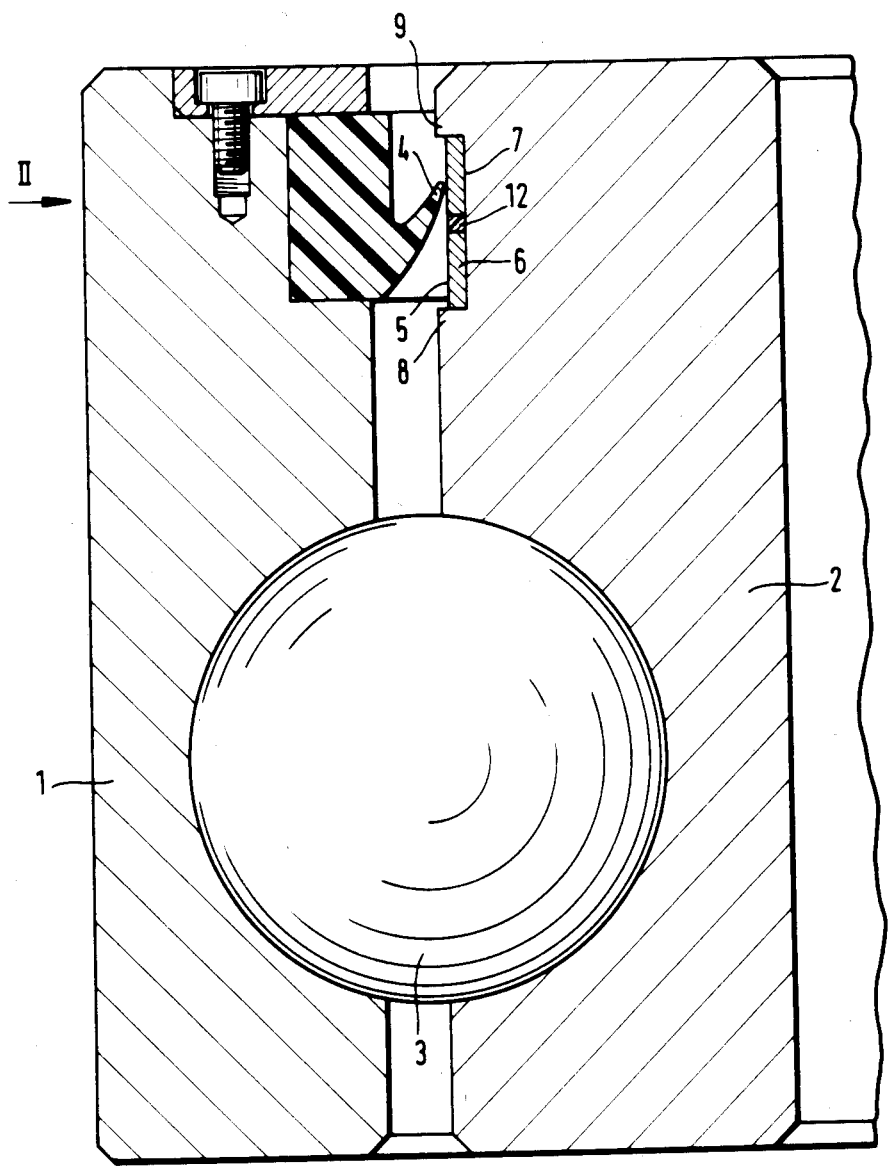
FIG. 1 is a partial longitudinal cross-section of a rolling bearing slewing ring of the invention and FIG. 2 is a partial view of the inner bearing ring of FIG. 1 taken in the direction of arrow II of FIG. 1.
Figure 2:
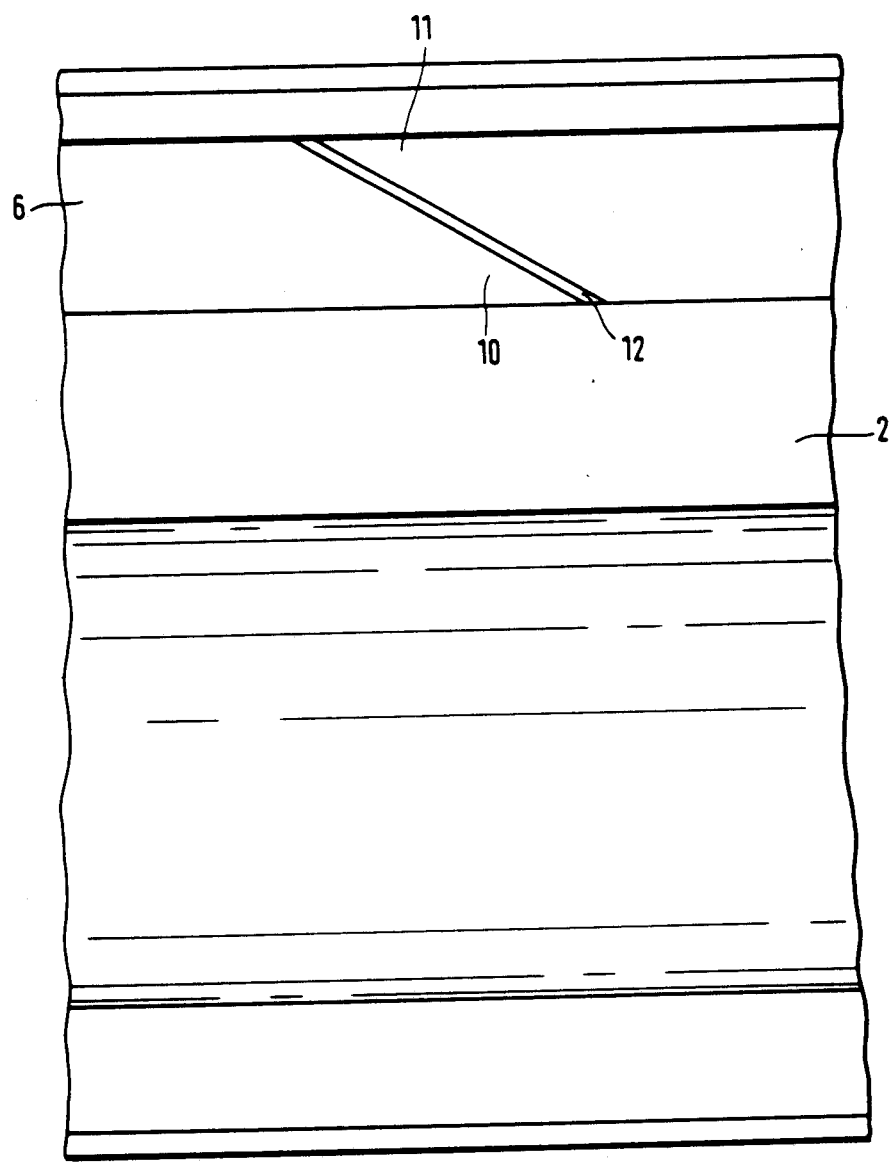

Referring now to FIGS. 1 and 2, the rolling bearing slewing ring is comprised of an outer bearing ring 1 and an inner bearing ring 2 between which rollers 3 run. Outer race 1 supports a seal with sealing lip 4 in sliding engagement with a cylindrical seal contact surface 5 of inner ring 2.

The seal contact surface 5 is formed by a finite band 6 of cold hardened steel fastened by glueing to a retention surface 7 of the inner ring 2 and retention surface 7 is axially limited on both sides by a radially oriented projections 8 and 9 with the edges of the band 6 being accommodated between them. As can be seen in FIG. 2, the union formed by the mutually facing ends 10 and 11 of the band 6 are at an angle to the axis of the rolling bearing slewing ring and the slit present at the union is filled with a pourable polymer material 12. Polymer material 1 possibly rising above the seal contact surface 5 after casting is removed by a manual grinding operation.

Figure 3:
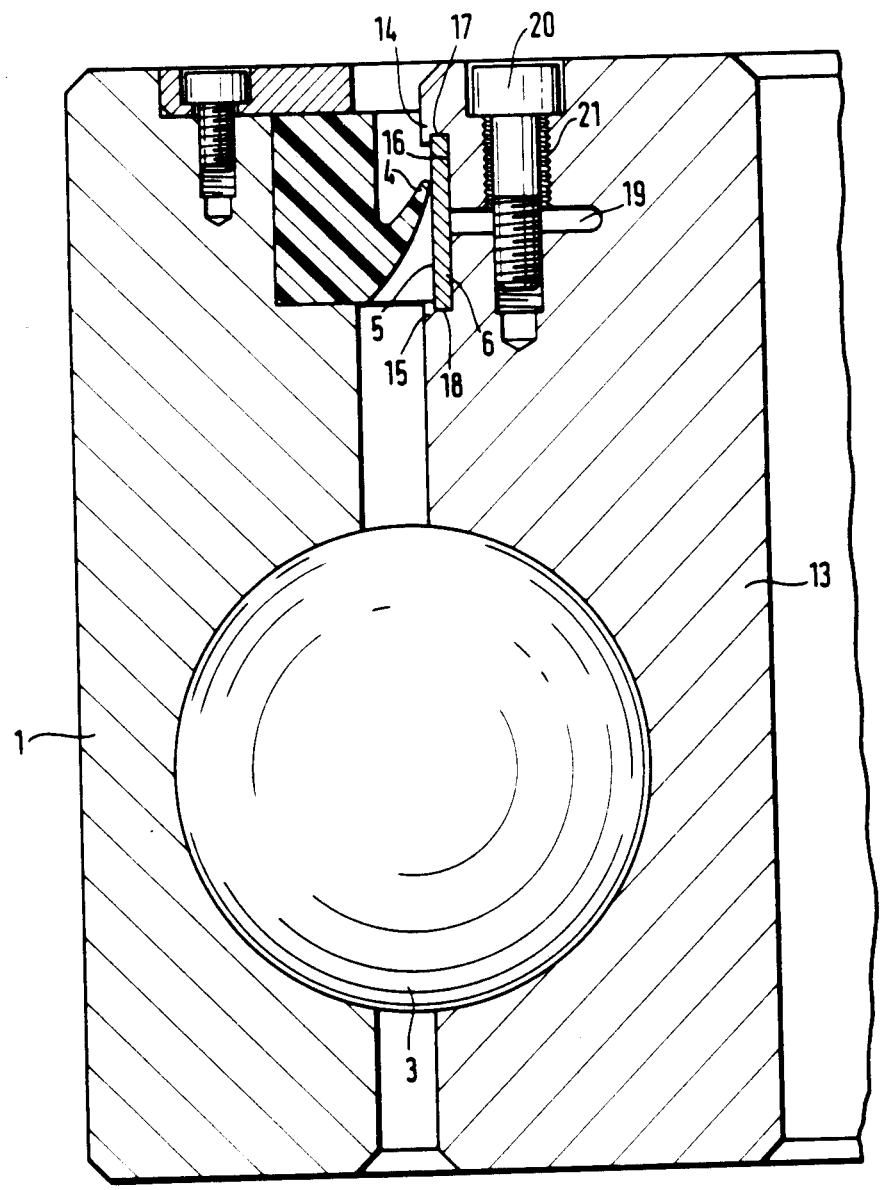
FIGS. 3 to 6 are partial longitudinal cross-sections of different rolling bearing slewing rings of the invention.

The rolling bearing slewing ring illustrated in FIG. 3 differs from the one described in FIGS. 1 and Z in that the band 6 is held form-closingly to inner ring 13. This is accomplished by providing in the mutually facing side surfaces the projections 14 and 15, which limit the retention surface 16 axially, slots 17 and 18 engaged by the edges of the band 6. The retention surface 16 of the inner race 13 is provided with a recess 19 which axially extends over in the area of the recess 19 by a multiplicity of screws 20, of which only one is shown, so that the edges of band 6 are additionally secured by frictional engagement between the base area of the slots 17 and 18 against turning on the retention surface 16. To be able to push the band 6 into the slots 17 and 18, the through holes for the screws 20 above the recess 19 are provided with a thread 21 into which are screwed pushing screws which permit the projections 14 and 15 to be spread apart far enough by elastic deformation of the inner race 13 that the band 6 can be inserted between them.

Figure 4:
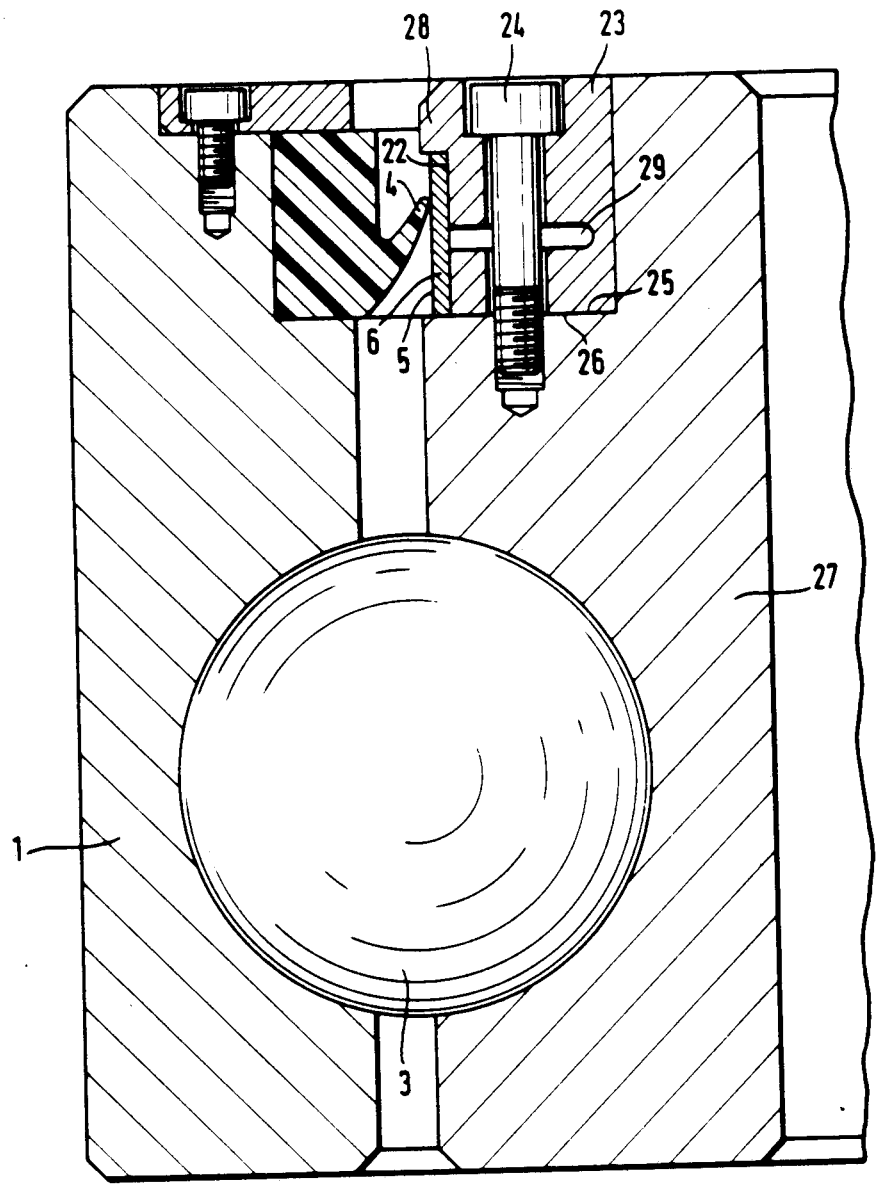

The rolling bearing slewing ring of FIG. 4 differs in that, first of all, the retention surface 22 is provided on a separate retaining ring 23 whose face 25 is held by screws 24 against a bearing surface 26 of the inner race 27. At its end away from the face 25, the retaining ring 23 has a projection 28 which limits the retention surface 22 axially, the band 6 being disposed between the side surface of the projection 28 facing the bearing surface 26 and an area of the bearing surface 26 rising radially above the retention surface 27. Since the retention surface 22 is again provided with a recess 29 extending over its entire circumference and recess 29 is penetrated by the screws 24, the retaining ring 23 and the inner race 27 can be axially braced by them so that the band 6 is secured by friction between the bearing surface 26 and the side surface of the projection 28 facing the former.

Figure 5:
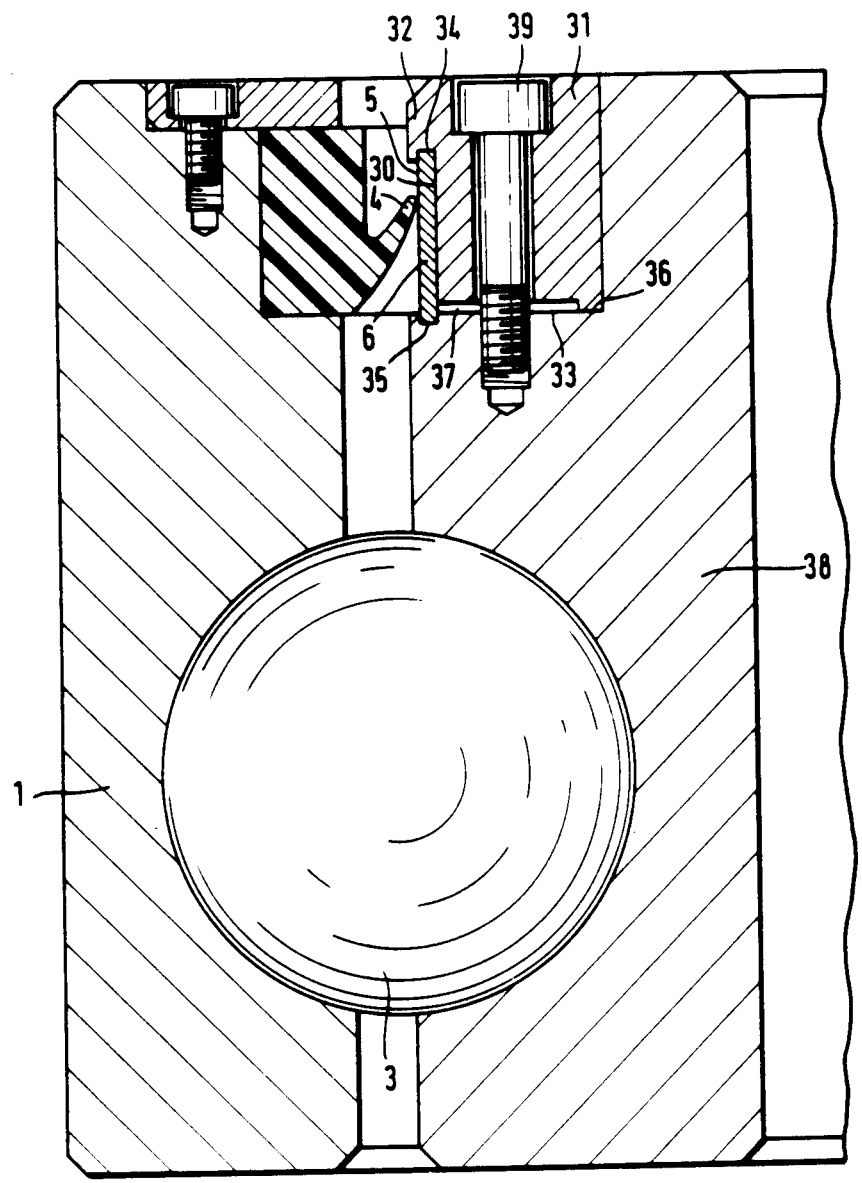

In the rolling bearing slewing ring of FIG. 5, the retention surface 30 is also provided on a separate retaining ring 31 whose projection 32 axially limits the retention surface 30. Provided in both the area of the bearing surface 33 rising above the retention surface 30 and in the side surface of the projection 32 facing the bearing surface 33 are slots 34 and 35 in which the band is accommondated form-closingly. The band 6 is secured against turning on the retention surface 30 because the retaining ring 31 has, on its face 36 resting against the bearing surface 33, a shoulder 37 emanating from the retention surface 30. By screws 39 keeping the retaining ring 31 on the inner race 38, both can be braced against each other axially so that the band 6 is secured by friction between the base areas of the slots 34 and 35.

Figure 6:
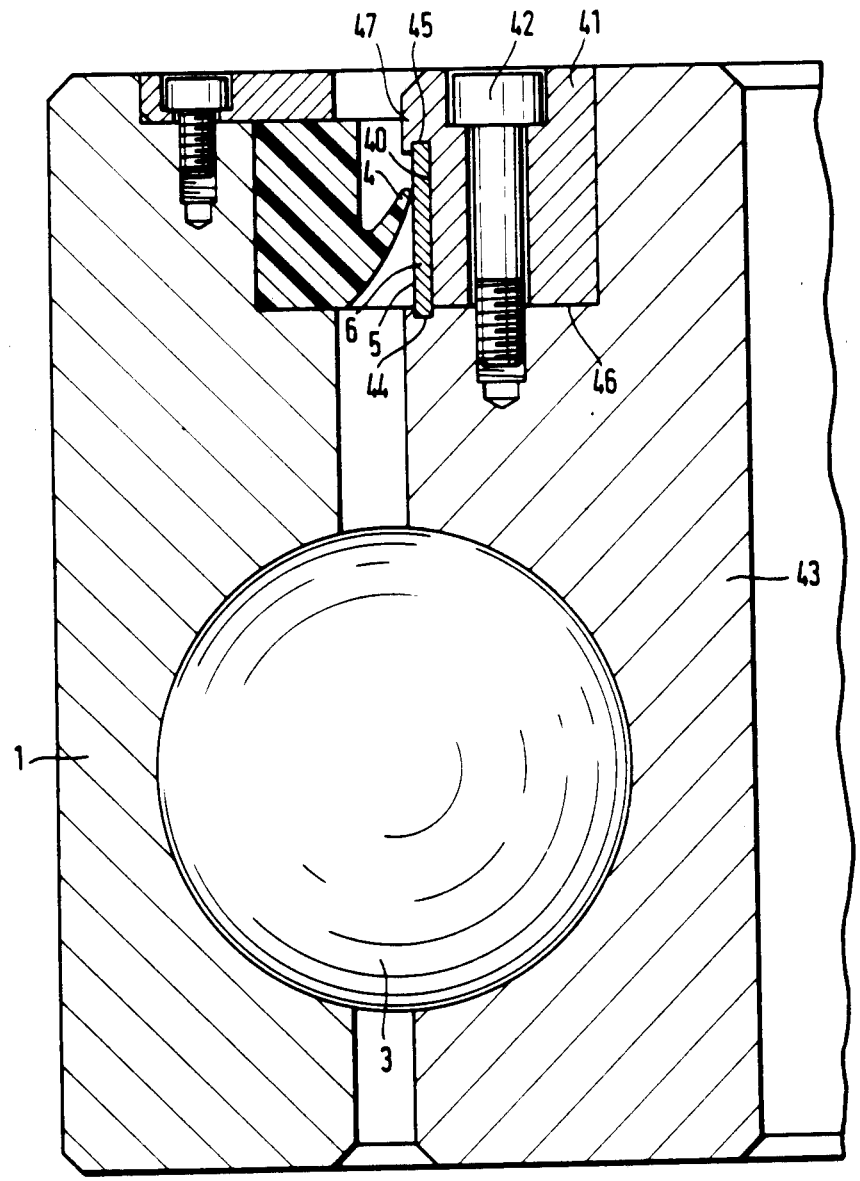

Finally, the retention surface 40 is provided on a separate retaining ring 41 in the slewing ring of FIG. 6 also with the retaining ring 41 being fastened to the inner race 43 by screws 42. The band 6 is accommodated form-closingly in the slots 44 and 45 provided in the area of the bearing surface 46 of the inner ring 43 rising above the retention surface 40 radially and in the side surface of the projection 47 of the retaining ring 41 limiting the retention surface 40 axially, which side surface faces the bearing surface 46 of the inner race 43. Securing band 6 against turning on the retention surface 40 can be achieved in that band 6 is additionally fastened materially., e.g. by glueing to the retention surface 40. But it is also possible to select the depth of the slots 44 and 45 so that the mutual spacing of their base surface is slightly less than the width of the band 6 when the retaining ring 41 is in contact with the bearing surface 46. When the retaining ring 41 is braced against the bearing surface 46 by the screws 42, the edges of the band 6 are clamped by friction between the base surfaces of the slot 44 and 45. Finally, an antiturning safety can also be obtained in that the width of the slot 44 and 45 is chosen slightly narrower than the width of the band 6.

The embodiment examples depict exclusively rolling bearing slewing rings with solid bearing rings but the invention may also be applied to rolling bearing slewing rings designed as wire roller bearing Also, differing from the embodiment examples shown, the seal bearing surface may be provided on the outer bearing ring.

Various other modifications of the slewing rings of the invention may be made without departing from the spirit or scope thereof and it is to be understood that the invention is intended to be limited only as defined in the appended claims.

What I claim is:

1. A rolling bearing slewing ring comprising two mutually concentric bearing rings between which rolling elements roll, a first bearing ring having a seal in sliding engagement with a cylindrical seal contact surface on a second bearing ring, characterized in that the seal contact surface (5) is a finite band (6) forming a union of its mutually facing ends (10,11) and being of a wear resistant material secured to a retention surface (7,16,22,30,40) of the second bearing ring.

2. A slewing ring of claim 1 wherein a polymeric material is inserted between the mutually facing ends (10 and 11) of the band (6).

3. A slewing ring of claim 1 wherein the retention surface (7,16,22,30,40) is axially limited on both sides by a radially oriented projection (8 and 9, 14 and 15, 26 and 28, 32 and 33, 46 and 47), lateral edges of the band (6) being accommodated between the projections (8 and 9, 14 and 15, 26 and 28, 32 and 33, 46 and 47).

4. A slewing ring of claim 3 wherein the band (6) is held in frictional engagement between the projections (14 and 15, 26 and 28, 32 and 33, 46 and 47).

5. A slewing ring of claim 4 wherein the band (6) is held by positive locking between the projections (8 and 9, 14 and 15, 26 and 28, 32 and 33, 46 and 47).

6. A slewing ring of claim 3 wherein the band (6) is fastened by glue to the retention surface (7, 40).

7. A slewing ring of claim 3 wherein the retention surface (16, 22) is provided with a recess (19,29) extending over the entire circumference of the retention surface and the edges of the band (6) are axially clamped between the projections (14 and 15, 26 and 28).

8. A slewing ring of claim 1 wherein the retention surface (22, 30, 40) is disposed as a separate retaining ring (23, 31, 41) fastened to the second bearing ring (27, 38, 43).

9. A slewing ring of claim 8 wherein first face (25, 36) of the retaining ring (23, 31, 41) is held at a bearing surface (26, 33, 46) of the second bearing ring (27, 38, 43) and that the end of the retaining ring facing away from the first face (25, 36) is provided with a first projection axially limiting the retention surface (22, 30 40), a second projection limiting the retention surface (22, 30, 40) at the other end being formed by an area of the bearing surface (26, 33, 46) which rises radially above the retention surface (22, 30, 40).

10. A slewing ring of claim 9 wherein the retaining ring (31) of the second bearing ring (38) has a shoulder (37) emanating from the retention surface (30) and is axially braced against the second bearing ring (38) in the area of this shoulder (37) so that the edges of the band (6) are axially clamped between the projection (32 and 33).

* * * * *